A. W. Porter,
Axe Handle,
N° 29,192.   Patented July 17, 1860.
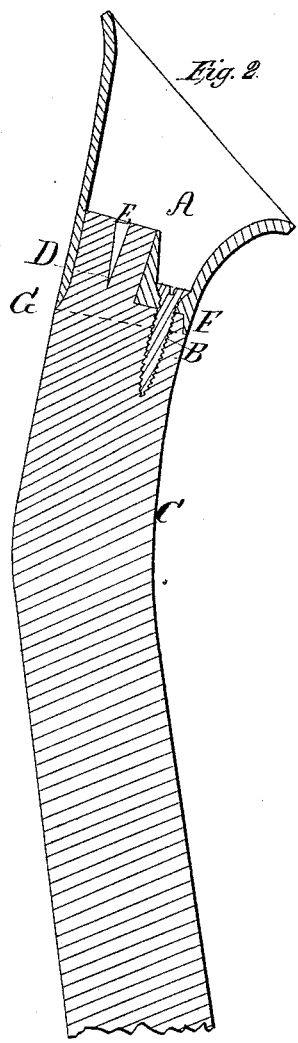
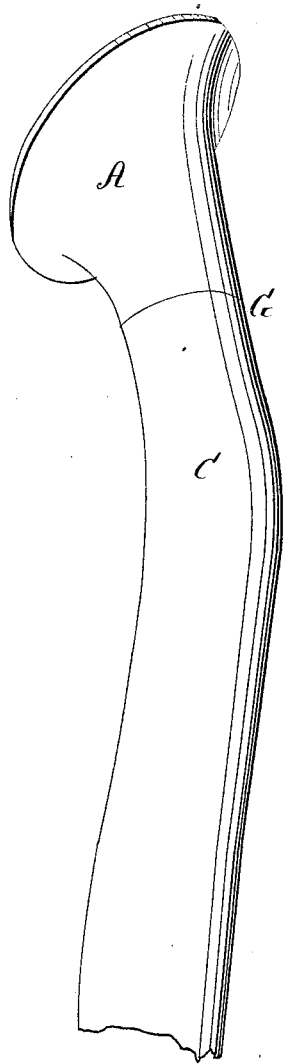
Witnesses;
J. C. Howells
Henry J. Greiber
Inventor;
Amul. W. Porter

UNITED STATES PATENT OFFICE.

ANCEL W. PORTER, OF ST. JOHNSVILLE, NEW YORK.

METAL CAP FOR AX-HELVES.

Specification of Letters Patent No. 29,192, dated July 17, 1860.

*To all whom it may concern:*

Be it known that I, ANCEL W. PORTER, of St. Johnsville, in the county of Montgomery and State of New York, have invented a new and Improved Ax-Helve and a New and Improved Mode of Manufacturing the Same; and I do hereby declare the following to be a full and exact description thereof, reference being had to the accompanying drawings and to the letters of reference marked thereon.

Similar letters of reference indicate like parts in all the drawings.

Figure 1 represents a perspective view of my improvement in ax helves and Fig. 2 represents a longitudinal section of the same.

The nature of my invention consists in providing the ax helve with an adjustable head and also in providing the helve with a suitable tenon in order to secure the head of the helve firmly in its position.

To enable others skilled in the art to make and use my invention, I will proceed to describe its construction as follows: Heretofore ax helves have been manufactured from a single piece of timber, resulting in loss of time, labor and material, from the fact that the head of the helve has to be worked out, in order to do which your timber must be about three inches by two and a half inches in size which is a waste of material so far as the other parts of the helve are concerned, again the time and labor consumed in shaping and working out the head add greatly to the cost of manufacture.

In order to obviate the objections and expenses above set forth, I construct my ax helve with an adjustable head thus making it in two distinct parts as can be seen by reference to Figs. 1 and 2 in the drawings which accompany this specification. This adjustable head for the ax helve can be made of any desirable shape or any suitable material, such as brass, iron, gutta percha, vulcanized india rubber, horn, &c., &c.

The adjustable head A, as seen in Fig. 2 is cast or molded hollow in order to secure lightness and to admit of its being more readily attached or fastened to the helve. This adjustable head is also provided with a suitable opening to receive the tenon D cut upon the end of the ax helve. It is also provided with another opening, countersunk, so as to admit of the passage of the screw B into the ax helve C, which serves to retain the head in position should the wedge E in the tenon D become displaced. Below the countersink where the screw enters the ax helve C, the adjustable head extends so as to form a flange or ferrule F which breaks the joint and diminishes the strain that might come upon the tenon D and securing a more perfect finish as may be seen at G, G, in Figs. 1 and 2.

The ax helves I cut out from suitable and well seasoned timber the desired length and in size about 1 by 2½ inches which is just a saving of two-thirds in the quantity of timber at present used. After they are cut out the tenon D is cut with a suitable auger and then I attach the adjustable head A to the helve by means of the wedge E and the screw B as seen in Fig. 2. The helve is now ready to be finished, which is done in the ordinary manner, the head at its point of contact with the helve serving as a guide for its dimension and finish. By this mode I secure economy in time, labor and material and when completed and put together it is a better ax helve than those now commonly in use, for should the helve by any accident be broken the head can be adjusted upon another helve at one fourth the cost now prevailing. By the use of these adjustable heads the hands are not much blistered, for when the hands become moist it serves to lubricate the parts, but it has a contrary effect with wood, for that absorbs the moisture, and as the wood is cut across the grain in forming the head of the helve, it swells and becomes rough, clings to the hand and galls and blisters it.

Having thus set forth the nature and object of my invention, I will proceed and state what I claim, and desire to secure by Letters Patent—

The head or cap for ax helves manufactured of metal or any suitable material and constructed as described, so as to be readily attached to the helve in the manner as set forth and specified.

ANCEL W. PORTER.

Witnesses:
J. C. HOWELLS,
HENRY J. GREIBER.